(12) United States Patent
Dykstra et al.

(10) Patent No.: US 10,563,497 B2
(45) Date of Patent: Feb. 18, 2020

(54) METHOD AND SYSTEM FOR SMART RESOURCE ALLOCATION

(71) Applicant: HALLIBURTON ENERGY SERVICES INC., Houston, TX (US)

(72) Inventors: Jason D. Dykstra, Spring, TX (US); Yuzhen Xue, Tulsa, OK (US)

(73) Assignee: HALLIBURTON ENERGY SERVICES, Houston, TX (US)

( * ) Notice: Subject to any disclaimer, the term of this patent is extended or adjusted under 35 U.S.C. 154(b) by 0 days.

(21) Appl. No.: 15/576,077

(22) PCT Filed: Feb. 18, 2016

(86) PCT No.: PCT/US2016/018475
§ 371 (c)(1),
(2) Date: Nov. 21, 2017

(87) PCT Pub. No.: WO2017/142539
PCT Pub. Date: Aug. 24, 2017

(65) Prior Publication Data
US 2018/0149011 A1    May 31, 2018

(51) Int. Cl.
*E21B 44/00* (2006.01)
*G05B 19/042* (2006.01)
(Continued)

(52) U.S. Cl.
CPC .......... *E21B 44/00* (2013.01); *G05B 19/0426* (2013.01); *G05B 19/401* (2013.01);
(Continued)

(58) Field of Classification Search
CPC .......... E21B 44/00; E21B 47/00; E21B 49/00; G05B 19/401; G05B 2219/45129
See application file for complete search history.

(56) References Cited

U.S. PATENT DOCUMENTS 6,587,938 B1 * 7/2003 Eilert ................... G06F 9/5061
                                                          712/13
9,260,943 B2 * 2/2016 Eriksson ................ E21B 47/12
(Continued)

FOREIGN PATENT DOCUMENTS

CA        2878859 A1 *  1/2014
WO   2008070864 A1     6/2008
(Continued)

OTHER PUBLICATIONS

Brett T. Stewart et al, Cooperative distributed model predictive control, Systems & Conttol Letters , p. 1-10, 2010 (Year: 2010).*
(Continued)

*Primary Examiner* — Rehana Perveen
*Assistant Examiner* — Chuen-Meei Gan
(74) *Attorney, Agent, or Firm* — Polsinelli PC

(57) ABSTRACT

A system including a plurality of subsystems having a controller coupled with a sensor, an actuator, and a processor; and a resource allocation processor coupled with each of the plurality of subsystems, the resource allocation processor comprising a memory storing instructions which cause the resource allocation processor to determine a drilling system model, receive the measurement from each of the plurality of subsystems, generate a subsystem interaction model based at least in part on the dynamic subsystem model of each of the plurality of subsystems, run a risk evaluation based at least in part on the subsystem interaction module and a risk threshold, generate a resource allocation model, and transmit the resource allocation model to each of the plurality of subsystems; and wherein the subsystem controller in each of the plurality of subsystems activates the actuator to adjust a subsystem parameter to meet the resource allocation model.

15 Claims, 12 Drawing Sheets

(51) Int. Cl.
*G05B 19/401* (2006.01)
*E21B 47/00* (2012.01)
*E21B 49/00* (2006.01)

(52) U.S. Cl.
CPC ............... *E21B 47/00* (2013.01); *E21B 49/00* (2013.01); *G05B 2219/45129* (2013.01)

(56) References Cited

U.S. PATENT DOCUMENTS

| | | | |
|---|---|---|---|
| 2005/0284659 A1* | 12/2005 | Hall | E21B 44/00 175/27 |
| 2006/0062249 A1* | 3/2006 | Hall | E21B 47/12 370/468 |
| 2008/0183415 A1* | 7/2008 | Dykstra | E21B 41/00 702/113 |
| 2010/0042458 A1 | 2/2010 | Rashid et al. | |
| 2010/0067329 A1 | 3/2010 | Edwards et al. | |
| 2010/0193245 A1* | 8/2010 | Glomsrud | E21B 44/00 175/45 |
| 2013/0218814 A1* | 8/2013 | Kang | G06Q 10/00 706/12 |
| 2013/0246032 A1* | 9/2013 | El-Bakry | E21B 41/00 703/10 |
| 2015/0066462 A1 | 3/2015 | Shetty et al. | |
| 2015/0081221 A1* | 3/2015 | Mancini | E21B 44/00 702/9 |
| 2015/0082316 A1* | 3/2015 | Zaldivar | G06F 9/4843 718/103 |
| 2015/0105912 A1* | 4/2015 | Dykstra | E21B 44/00 700/275 |
| 2016/0070024 A1* | 3/2016 | Berard | G01V 99/005 703/10 |
| 2016/0312552 A1* | 10/2016 | Early | G05B 13/041 |
| 2017/0185929 A1* | 6/2017 | Theriault | G06Q 10/06312 |
| 2018/0087321 A1* | 3/2018 | Johnston | E21B 7/04 |

FOREIGN PATENT DOCUMENTS

| | | | |
|---|---|---|---|
| WO | 2008139171 A2 | 11/2008 | |
| WO | 2015030820 A1 | 3/2015 | |
| WO | 2015057242 A1 | 4/2015 | |
| WO | 2015084402 A1 | 6/2015 | |
| WO | 2015084405 A1 | 6/2015 | |
| WO | WO 2015/084402 A1 * | 6/2015 | ............ E21B 44/02 |
| WO | 2015137931 A1 | 9/2015 | |

OTHER PUBLICATIONS

Dragos Florin Ciocan, Vivek Farias, Model Predictive Control for Dynamic Resource Allocation, Mathematics of Operations Research, vol. 37, No. 3, Aug. 2012, pp. 501-525 (Year: 2012).*

Morteza Soleimani, Mohammad Pourgol-Mohammad, Ali Rostami, and Ahmad Ghanbari Design for Reliability of Complex System: Case Study of Horizontal Drilling Equipment with Limited Failure Data Journal of Quality and Reliability Engineering vol. 2014, Article ID 524742, 13 pages (Year: 2014).*

Foong, Oi Mean, and Mohamad Izuddin Nordin. "Decision support system for alarm rationalization using risk assessment matrix." International Journal of Computer Applications 4, No. 9 (2010): 8-13. (Year: 2010).*

International Search Report and Written Opinion; PCT Application No. PCT/US2016/018475; dated Nov. 8, 2016.

B.T. Stewart, et al., Cooperative distributed model predictive control, Systems & Control Letters (2010), doi:10.1016/j.sysconle.2010.06.005.

Thomas Lipp, Steve Boyd, (2015) "Antagonistic Control" http://stanford.edu/-bovd/papers/pdf/antaci control.pdf.

* cited by examiner

METHOD AND SYSTEM FOR SMART RESOURCE ALLOCATION

FIELD

The present disclosure generally relates to methods and systems for resource allocation among a plurality of systems. In particular, the subject matter herein relates to equipment failure timeline assessment and a smart resource allocation method among a plurality of systems within a drilling system.

BACKGROUND

Wellbores can be drilled into the earth for a variety of purposes including tapping into hydrocarbon bearing formations to extract the hydrocarbons for use as fuel, lubricants, chemical production, and other purposes. Systems for drilling subterranean wellbores can be complex, often involving multiple subsystems. These systems must work in conjunction in order to maintain a functioning well. The drilling subsystems may include, for instance, a rig subsystem, a drilling fluid subsystem, and a bottom hole assembly (BHA) subsystem. Each drilling subsystem typically collects measurements from sensors to detect various parameters related to the drilling process. Drilling systems are generally characterized by subsystem equipment and measurement devices spread over large distances, which can involve communication delays and inefficient resource consumption.

Several parameters can affect the drilling operations including drilling speed, mud equivalent circulating density (ECD) and path orientation. Many control methods can control an individual subsystem based on the above parameters. During the process, several of the systems may pull from the same resources, for example, communication, power, flow, and control input. Each system is controlled independently using automatic algorithms, such that the individual systems can update or change their functions based on different parameters. Any change in one subsystem's resource consumption can affect the other subsystems in a minimal or detrimental way.

BRIEF DESCRIPTION OF THE DRAWINGS

Implementations of the present technology will now be described, by way of example only, with reference to the attached figures, wherein.

DETAILED DESCRIPTION

Figure 1:
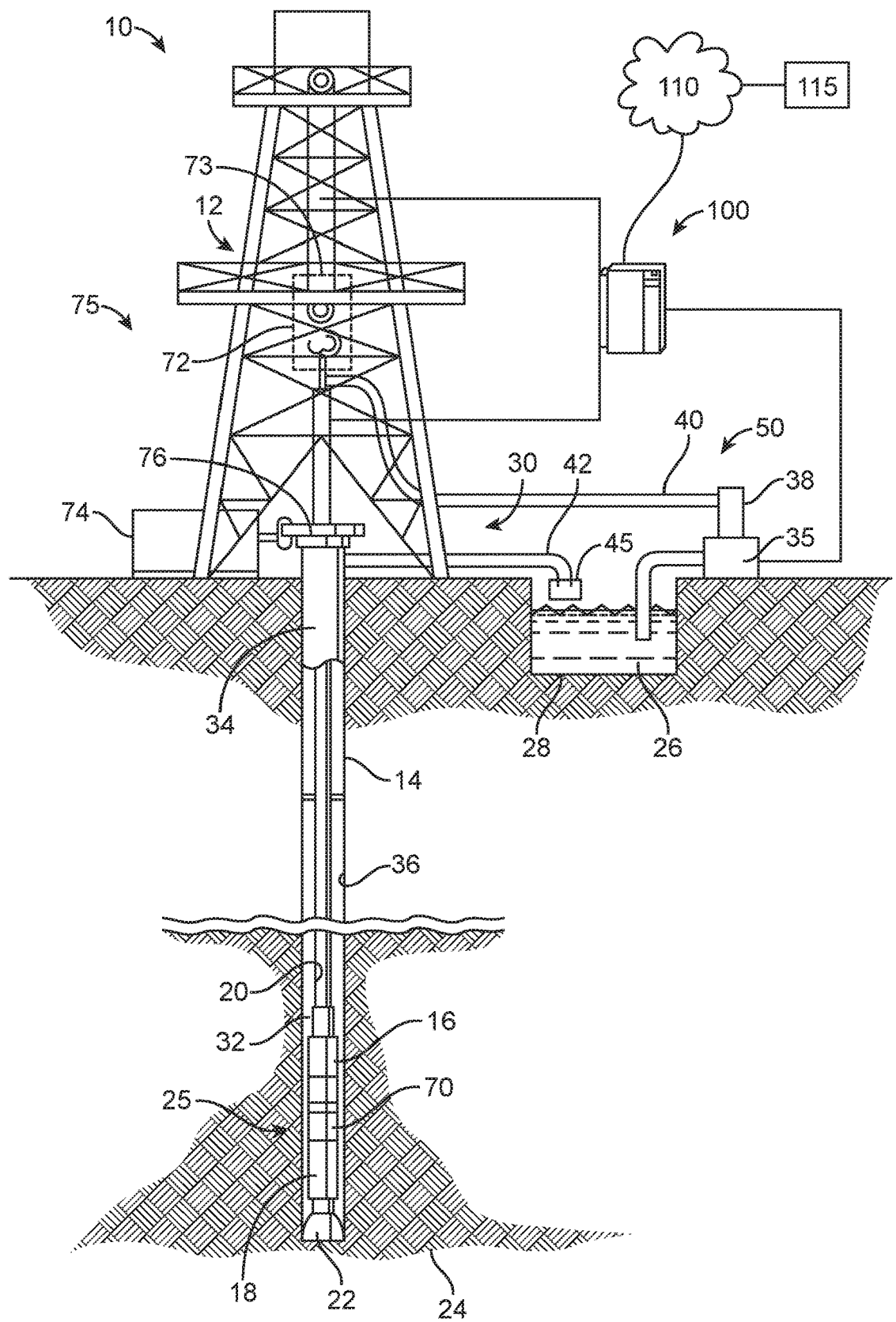
FIG. 1 is a diagram illustrating an exemplary drilling system according to the disclosure herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The terms "comprising," "including," and "having" are used interchangeably in this disclosure. The terms "comprising," "including," and "having" mean to include, but not necessarily be limited to, the things so described.

Disclosed herein are a method and a system to balance drilling performance and potential failure using a smart resource allocation method. Real time data is obtained from a plurality of subsystems, each of which is controlled by a subsystem controller configured to control subsystem resource consumption. Each subsystem can transmit data to a resource allocation processor configured to optimize the drilling process throughout the entire drilling system using a smart resource allocation method to monitor and control resource consumption of each subsystem. The resource allocation processor can generate a subsystem interaction module based at least in part on measurements taken from each of the plurality of subsystems. The subsystem interaction module can be compared to a drilling system model in order to determine if the resources are properly allocated among the subsystems. If not, the resource allocation processor can run a risk evaluation, such as an equipment failure evaluation, based on the information gathered from each of the plurality of subsystems. A resource allocation model can be created in order to effectively distribute resource use throughout the drilling system in order to avoid system failure. The resource allocation module can be transmitted to the subsystem controller for each of the subsystems; the subsystem controllers can then activate the subsystem actuator to adjust the resource consumption.

FIG. 1 illustrates a diagram of an exemplary embodiment of a wellbore operating environment 10 in which a drilling control apparatus, method, and system may be deployed in accordance with certain embodiments of the present disclosure. The wellbore operating environment 10 includes a plurality of drilling subsystems. For example, FIG. 1 depicts the wellbore operating environment 10 as including a bottom hole assembly (BHA) subsystem 25, drilling fluid system 50, and a rig subsystem 75. However, the wellbore operating environment 10 may include any number of subsystems. Additionally, each of the subsystems illustrated in FIG. 1 may be further divided into additional subsystems, or may themselves be included in other subsystems, without departing from the scope and spirit of the present disclosure.

As depicted in FIG. 1, the wellbore operating environment 10 may include a drilling rig 12 positioned above a borehole 14. The drilling rig 12 includes a drill string 20 disposed within the borehole 14. A BHA subsystem 25 is located at the downhole end of the drill string 20. The BHA subsystem 25 includes a drill bit 22 that penetrates the earth formation 24 to form a borehole 14. The BHA subsystem 25 further includes a fluid-driven motor assembly 70 that drives the drill bit 22. The BHA subsystem 25 may provide directional control of the drill bit 22. In at least one aspect of the present disclosure, the drill bit 22 is a rotatable drill bit and the BHA subsystem is a steerable BHA subsystem 25 including a Measurement While Drilling (MWD) system with various sensors 18 to provide information about the earth formations 24 and downhole drilling parameters. The MWD sensors in the BHA subsystem 25 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The MWD may also include additional/alternative sensing devices for measuring shock, vibration, torque, telemetry, etc. The BHA subsystem 25 may further include actuators capable of steering the drill bit 22 or otherwise adjusting the path direction of the drill bit 22 and drill string 20. In at least one aspect of the present disclosure, the BHA subsystem 25 includes a subsystem controller capable of processing data obtained from sensors 18. The subsystem controller can adjust the path direction of the drill bit 22 and drill string 20 in response to the data by sending a command signal to one or more actuators capable of adjusting the subsystem resource consumption. The sensors 18 may transmit data through a subsystem controller to a resource allocation processor 100 on the earth's surface using telemetry such as conventional mud pulse telemetry systems or any wired, fiber optic, or wireless communication system. The resource allocation processor 100 can include any suitable computer, controller, or data processing apparatus capable of being programmed to carry out the method and apparatus as further described herein. The resource allocation processor 100 can also be communicatively coupled with an input device 115. The input device can be any suitable computer, controller, or data processing apparatus capable of compiling observations input by users. As such, the resource allocation processor 100 can process the sensor data in accordance with the embodiments of the present disclosure as described herein.

In the alternative, the resource allocation processor 100 can transmit the data to another location for processing. For example, the resource allocation processor 100 can be communicatively coupled with each of the subsystems via the subsystem controllers and a network 110. The network 110 can be any network for transmitting and receiving data from the subsystems, such as, a local area network (LAN), wide area network (WAN), and telephone network, such as a Public Switched Telephone Network (PTSN), an intranet, the Internet, or combinations thereof. In at least one aspect of the present disclosure, the network 110 can be a telemetry network, such as a mud pulse telemetry network, an electromagnetic telemetry network, a wired pipe network, a pipe-in-pipe network, an acoustic telemetry network, a torsion telemetry network, or combinations thereof. In the alternative, the network 110 can be a combination of traditional or telemetry networks.

The resource allocation processor 100 can receive observations from the input device 115 and measurement data from one or more subsystem controllers. The resource allocation processor 100 can also transmit instructions to each of the subsystem controllers. In at least one aspect of the present disclosure, the resource allocation processor 100 can send instructions to each of the subsystem controllers sufficient to coordinate resource consumption between the subsystems of the drilling system during drilling operations.

Additionally, network 110 can facilitate communication with servers or other shared data systems. For example, the resource allocation processor 100 can share subsystem sensor measurement data and subsystem controller actions with servers, computers, or devices, including, but not limited to, the input device 115, over network 110.

In at least one aspect of the present disclosure, the BHA subsystem 25 can include a Logging While Drilling (LWD) System with additional sensors or logging tools 16. The logging tools, sensors, or instruments 16, can be any conventional logging instrument, such as acoustic (sonic), neutron, gamma ray, density, photoelectron, nuclear magnetic resonance, or any other conventional logging instrument, or combinations thereof, which can be used to measure lithology or porosity of earth formations surrounding the borehole 14. The sensors or logging tools 16 can transmit data to the resource allocation processor 100 through the subsystem controllers using telemetry such as those discussed above. The resource allocation processor 100 can process the sensor data or transmit the data for processing at another location.

The BHA subsystem 25 can also include additional sensors in conjunction with the fluid-driven motor 70 that can monitor the revolutions per minute (RPM) of the motor 70 and identify changes in torque or power required to maintain constant rotation, such as a torque meter. Such sensors may be internal or external to the fluid-driven motor 70.

In addition to MWD sensors, LWD sensors, and instrumentation, wireline instrumentation can also be used in conjunction with the BHA subsystem 25. The wireline instrumentation can include any conventional logging instrumentation which can be used to measure the lithology and/or porosity of earth formations 24 surrounding a borehole 14, for example, acoustic, neutron, gamma ray, density, photoelectric, nuclear magnetic resonance, or any other conventional logging instrument, or combinations thereof.

As depicted in FIG. 1, a drilling fluid subsystem 50 can pump drilling mud 26 via pumps 38 from a storage reservoir pit 28 near the wellhead 30, down an axial passageway (not illustrated) through the drill string 20, through the fluid-driven motor assembly 70, and out of a plurality of apertures within the drill bit 22. As used herein, the term "drilling mud" may be used interchangeably with "drilling fluid" to refer to both drilling mud alone and a mixture of drilling mud and formation cuttings, or alternatively, to refer to both drilling fluid alone and a mixture of drilling fluid and formation cuttings. The drilling mud 26 then flows back to the surface through the annular region 32 between the drill string 20 and the sidewalls 36 of the borehole 14. A metal casing 34 may be positioned in the borehole 14 above the drill bit 22 configured to maintain the integrity of the upper portion of the borehole 14 and prevent fluid transmission (such as drilling mud 26) between borehole 14 and earth formation 24.

The drilling fluid subsystem 50 can include one or more sensors capable of measuring the pumping rate or the downhole drilling fluid flow rate. The drilling fluid subsystem 50 can include one or more actuators configured to adjust parameters with respect to pump 38, including, but not limited to, pump rate and the drilling fluid flow rate. The drilling mud can travel through a mud supply line 40 which is coupled with a central passageway extending throughout the length of the drill string 20 and exits through apertures in the drill bit 22 to cool and lubricate the drill bit 22 and carry formation cuttings to the surface. The cuttings and mud mixture pass through a fluid exhaust conduit 42, coupled with the annular region 32 at the well head 30, into a trough system 45 that can include shakers and a centrifuge (not shown). The shakers can separate a majority of solids, such as cuttings and fines, from the drilling mud 26. The cleaned mud is then returned to the mud storage pit 28.

The drilling fluid subsystem 50 can include sensors in the trough system 45 configured to analyze the nature as well as the volume, quantity, or weight of the cuttings and fines being removed from the well. Additionally, the drilling fluid subsystem 50 may include sensors configured to determine the particle size distribution (PSD), density, and/or visual characteristics of the cuttings. For example, the drilling fluid subsystem 50 may include sensors capable of determining whether the cuttings are being efficiently removed from the borehole 14. The drilling fluid subsystem 50 can include actuators configured to adjust or control the performance of the shakers and centrifuges. For example, the actuators can control shaker parameters such as screen desk angle, vibration, G-force, and mud equivalent circulating density (ECD).

The drilling fluid subsystem 50 can further include one or more sensors configured to determine fluid properties of the drilling mud. The drilling fluid subsystem 50 can also include one or more mixers 35 to mix mud obtained from the mud storage pit with appropriate additives. For example, the mixers 35 can control the rheological properties of the drilling fluid as well as the density, electrical stability, percent solids, oil/water ratio, acidity (pH), salinity, and particle size distribution. The drilling fluid subsystem 50 can include one or more actuators to control the properties of the drilling fluid. For example, the actuators can control additive supply valves, feed rates, mixture composition, discharge rates, and other aspects of the mixing process.

As described above, the wellbore operating environment 10 can further include a rig subsystem 75. The rig subsystem 75 can include a top drive motor 72, a draw works 73, a rotary table 76, and a rotary table motor 74. The rotary table motor 74 can rotate the drill string 20 or, in the alternative, the drill string 20 can be rotated via the top drive motor 72. The rig subsystem 75, at least in part, drives the drill bit 22 by providing sufficient weight-on-bit (WOB), revolutions per minute (RPM) and torque to create the borehole 14. The rig subsystem 75 can include one or more sensors to measure, for instance, RPM, WOB, torque-on-bit (TOB), rate of penetration (ROP), well depth, hook load, and standpipe pressure. Additionally, the rig subsystem 75 can include actuators to adjust or control the above described drilling parameters.

Although FIG. 1 generally depicts a vertical wellbore, it would be obvious to those skilled in the art that the present disclosure is equally well suited for use in wellbores having other orientations including horizontal wellbores, slanted wellbores, multilateral wellbores or the like. Additionally, even though FIG. 1 depicts an onshore operation, the present disclosure is equally well-suited for use in offshore operations. Offshore oil rigs that can be used in accordance with the present disclosure include, but are not limited to, floaters, fixed platforms, gravity-based structures, drill ships, semi-submersible platforms, jack-up drilling rigs, tension-leg platforms, and the like. The present disclosure is also suited for use in rigs ranging anywhere from small in size and portable to bulky and permanent.

Although shown and described with respect to a rotary drill system in FIG. 1, many types of drills can be employed in carrying out embodiments of the invention including, but not limited to, Auger drills, air core drills, cable tool drills, diamond core drills, percussion rotary air blast (RAB) drills, reverse circulation drills, and the like. Additionally, the present disclosure is suited for use in any drilling operation that generates a subterranean borehole. For example, the present disclosure is suited for drilling for hydrocarbon or mineral exploration, environmental investigations, natural gas extraction, underground instillation, mining operations, water wells, geothermal wells, and the like.

Figure 2:
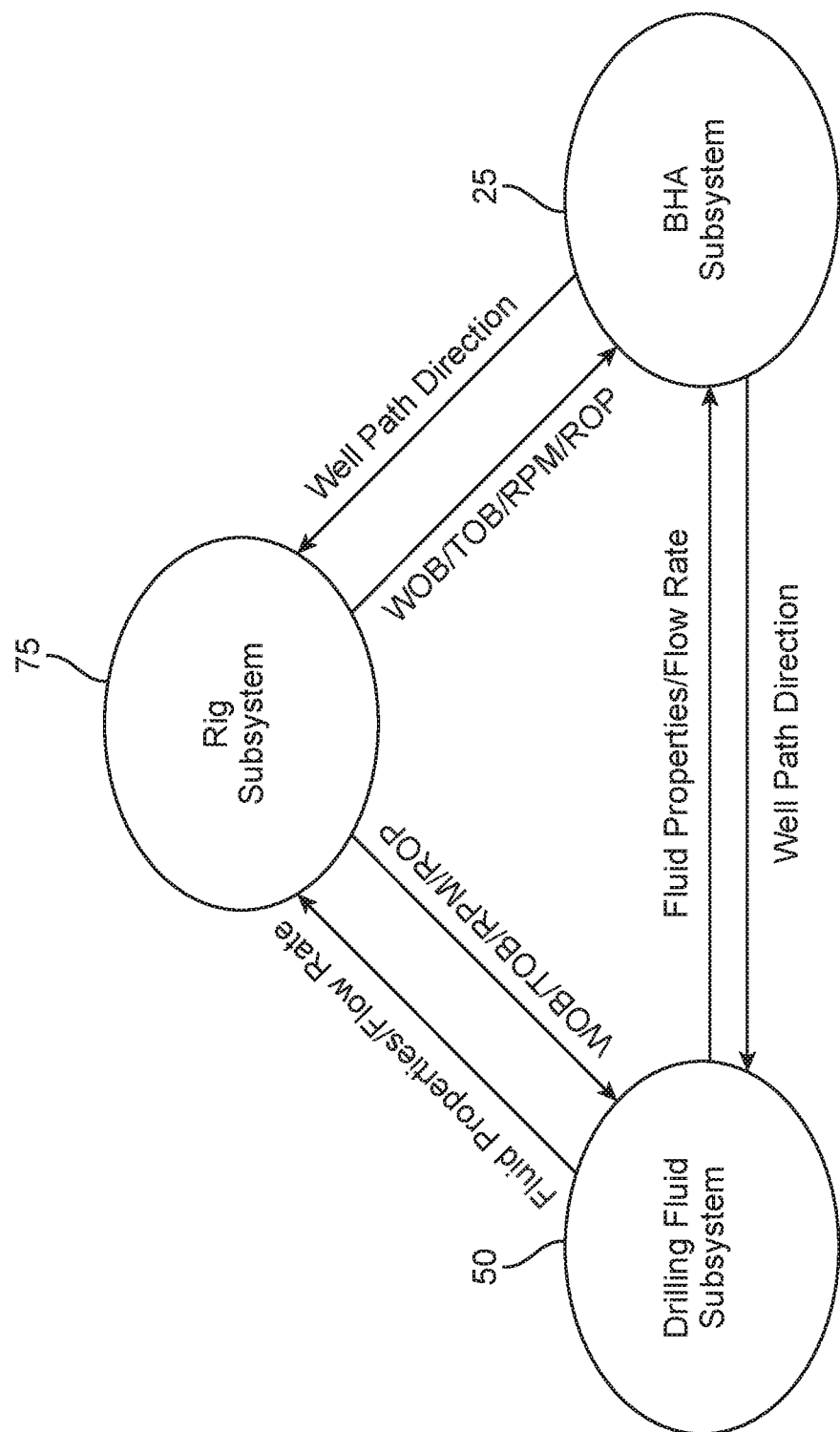
FIG. 2 is a diagram illustrating the interactions between drilling subsystems, according to the disclosure herein.

An exemplary interaction between the above described drilling subsystems is detailed in FIG. 2. As depicted in FIG. 2, control actions taken by any individual drilling subsystems can affect the performance of one or more other drilling subsystems. For example, the drilling fluid subsystem 50 provides drilling mud that is circulated downhole to cool the drill bit and transport the cuttings to the surface for disposal. The drilling fluid subsystem 50 includes a mud conditioning system to process the circulated drilling fluid with shakers, centrifuges, and other cutting removal equipment. Before the drilling fluid is recirculated, make-up water and other additives can be added to the drilling fluid to obtain the desired density and rheological profile. As such, the drilling fluid subsystem 50 directly determines the drilling fluid flow rate (downhole pumping rate) and the properties of the drilling fluid (for example, the rate of additive or make-up water added to the system). The drilling fluid properties and downhole drilling fluid flow rate can affect the performance and control parameters of the rig 75 and BHA 25 subsystems. For example, the drilling fluid properties and flow rate can determine in part the ability of the BHA subsystem 25 to effectively control the well path direction. The drilling fluid properties and flow rate can also affect the rig subsystem control parameters, such as WOB, TOB, or RPM, necessary to create the borehole or achieve the desired ROP.

Similarly, a change in the well path direction, controlled by the BHA subsystem 25, can require changes in the drilling fluid properties or flow rate, controlled by the drilling fluid subsystem 50. The well path direction (controlled by the BHA subsystem 25) can additionally affect the rig subsystem 75 control decisions. Likewise, the manipulation of rig subsystem 75 variables, such as WOB and RPM, can affect the control behaviors of the BHA subsystem 25 and the drilling fluid subsystem 50.

Referring back to FIG. 1, each subsystem can include a subsystem controller that is communicatively coupled with at least one subsystem sensor and at least one subsystem actuator. The subsystem controller can receive measurement data collected by subsystem sensors and determine a local subsystem state based in part on the measurements received from the subsystem sensors. Additionally, the subsystem controller can send command signals to the subsystem actuators and cause the actuators to adjust one or more drilling parameter. For example, the actuators can convert the command signals from subsystem controllers into actions such as movement of a control valve shaft or the change of speed of a pump. The command signals can include, but are not limited to, electrical, pneumatic, hydraulic, acoustic, electromagnetic radiation, and various combinations thereof. The actuators can be of various kinds, including, but not limited to, variable speed motors, variable speed drives, pneumatic actuators, electrical actuators, hydraulic actuators, rotary actuators, servo motor actuators, and various combinations thereof. In some cases, the subsystem controller can send command signals to a lower level controller configured to activate an actuator to adjust subsystem resource consumption. The lower level controllers can be relatively simple controllers such as a proportional-integral-derivative (PID) type controller or a control loop feedback mechanism controller.

Figure 3A:
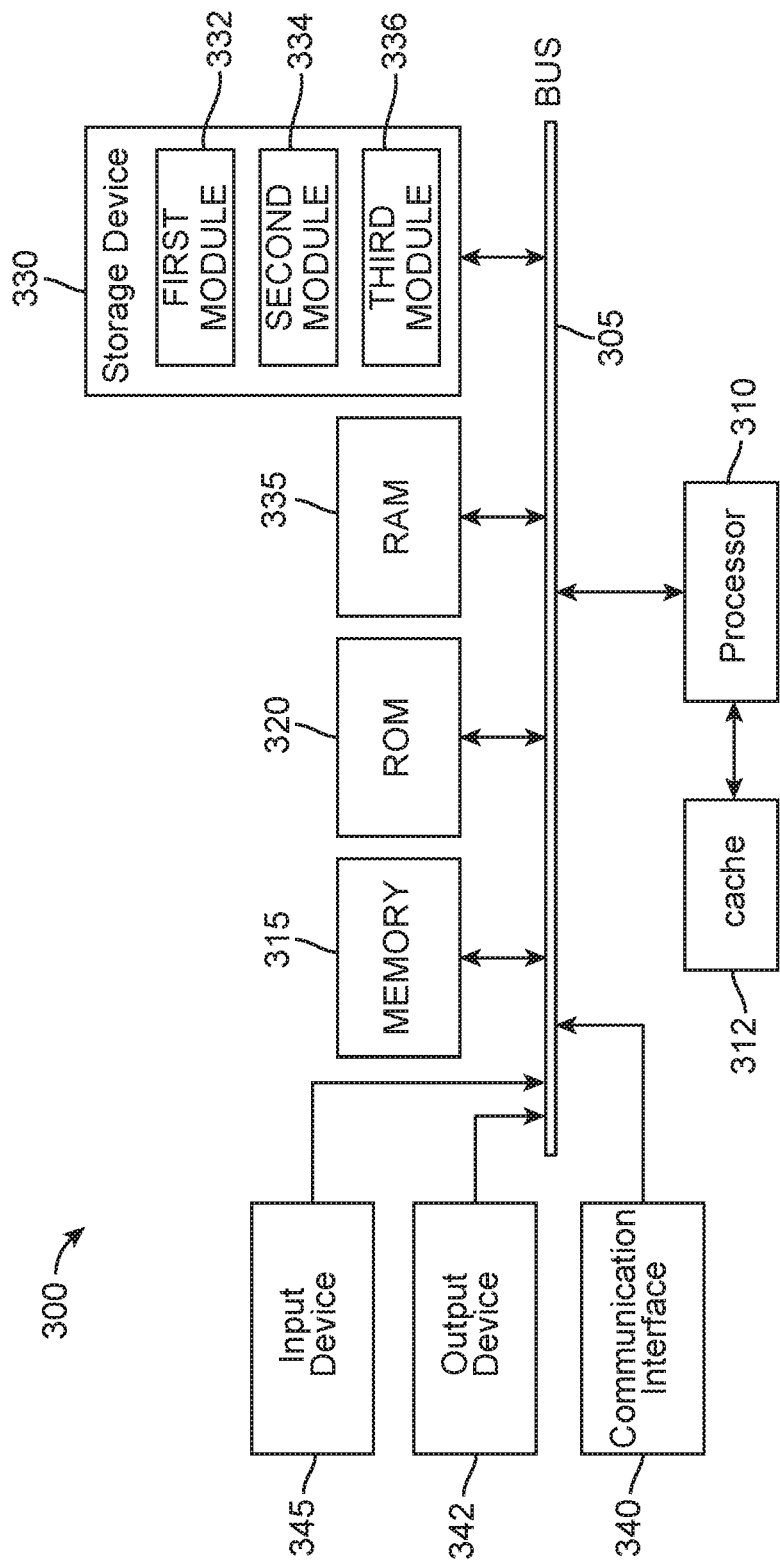
FIG. 3A illustrates an exemplary system embodiment according to the disclosure herein.
Figure 3B:
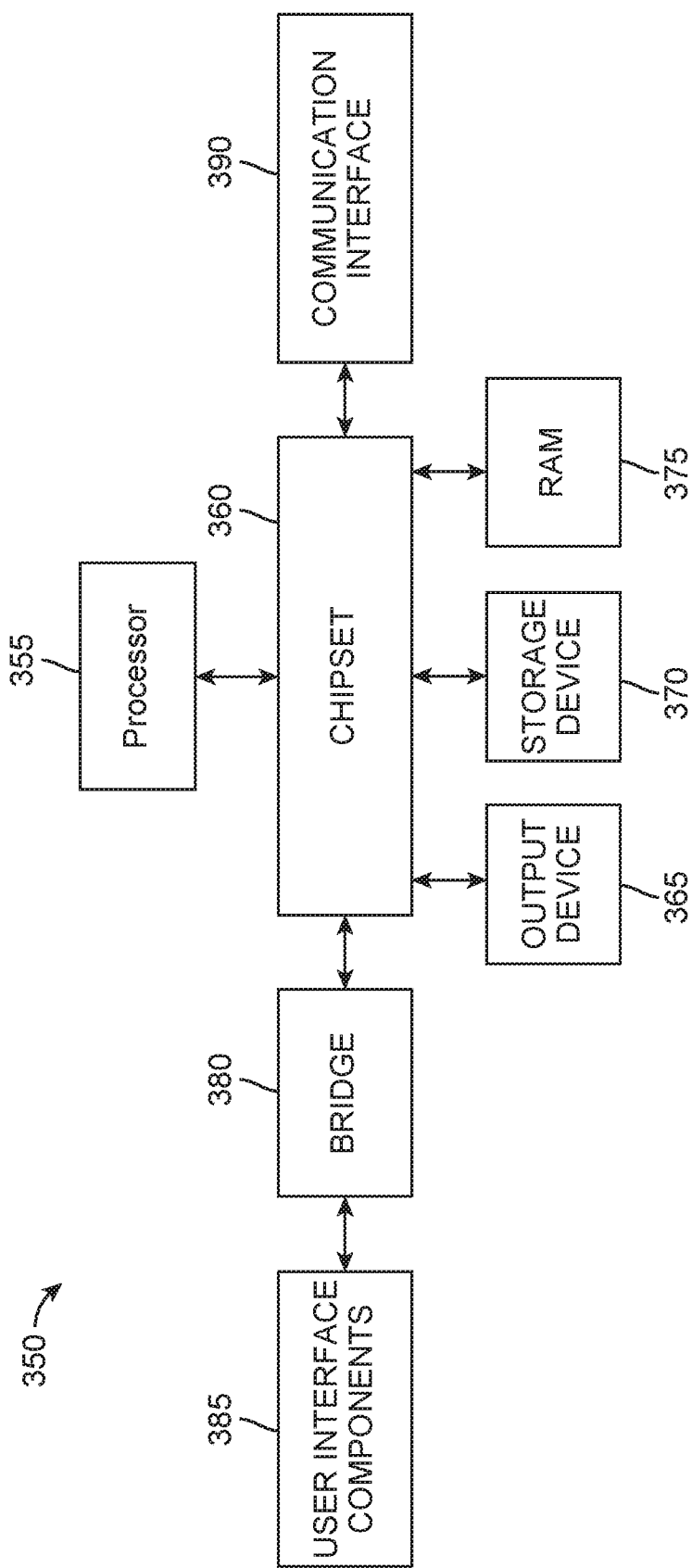
FIG. 3B illustrates a second exemplary system embodiment according to the disclosure herein.

The subsystem controller can include any suitable computer, controller, or data processing apparatus capable of being programmed to carry out the method and apparatus as further described herein. FIGS. 3A and 3B illustrate exemplary subsystem controller embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. For example, the resource allocation processor, input device, and subsystem controllers of FIG. 1 can be a form of this processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as a first module 332, a second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, a tape drive, a solid-state drive, a RAM drive, a removable storage device, a redundant array of inexpensive disks (RAID), a hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 325, ROM 320, a cable containing a bit stream, and hybrids thereof.

The logical operations for implementation of the present disclosure can include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors. (Use of the term "processor" should not be construed to refer exclusively to hardware capable of executing software). Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Figure 4:
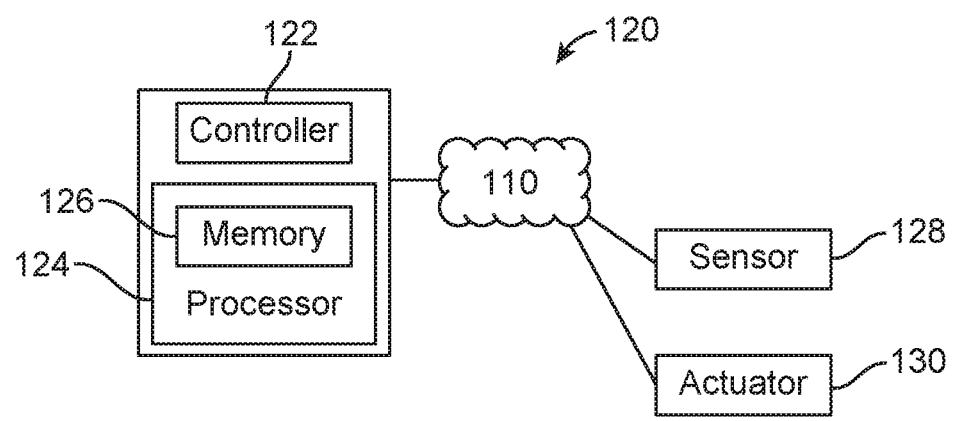
FIG. 4 is a block diagram illustrating an exemplary subsystem, according to the disclosure herein.

A general subsystem 120 according to the disclosure herein is illustrated in FIG. 4. The subsystem 120 can contain a subsystem controller 122 coupled with a processor 124, wherein the processor further comprises a memory 126. The subsystem controller 122 is further communicatively coupled with a sensor 128 and an actuator 130 via a network 110. The network 110 can be any network capable of transmitting and receiving data, as described in detail above with respect to FIG. 1. While FIG. 4 generally depicts a subsystem 120 having a single sensor 128 and a single actuator 130, it should be obvious to those skilled in the art that the subsystem can include any number of sensors 128 or actuators 130 without departing from the disclosure.

Figure 5:
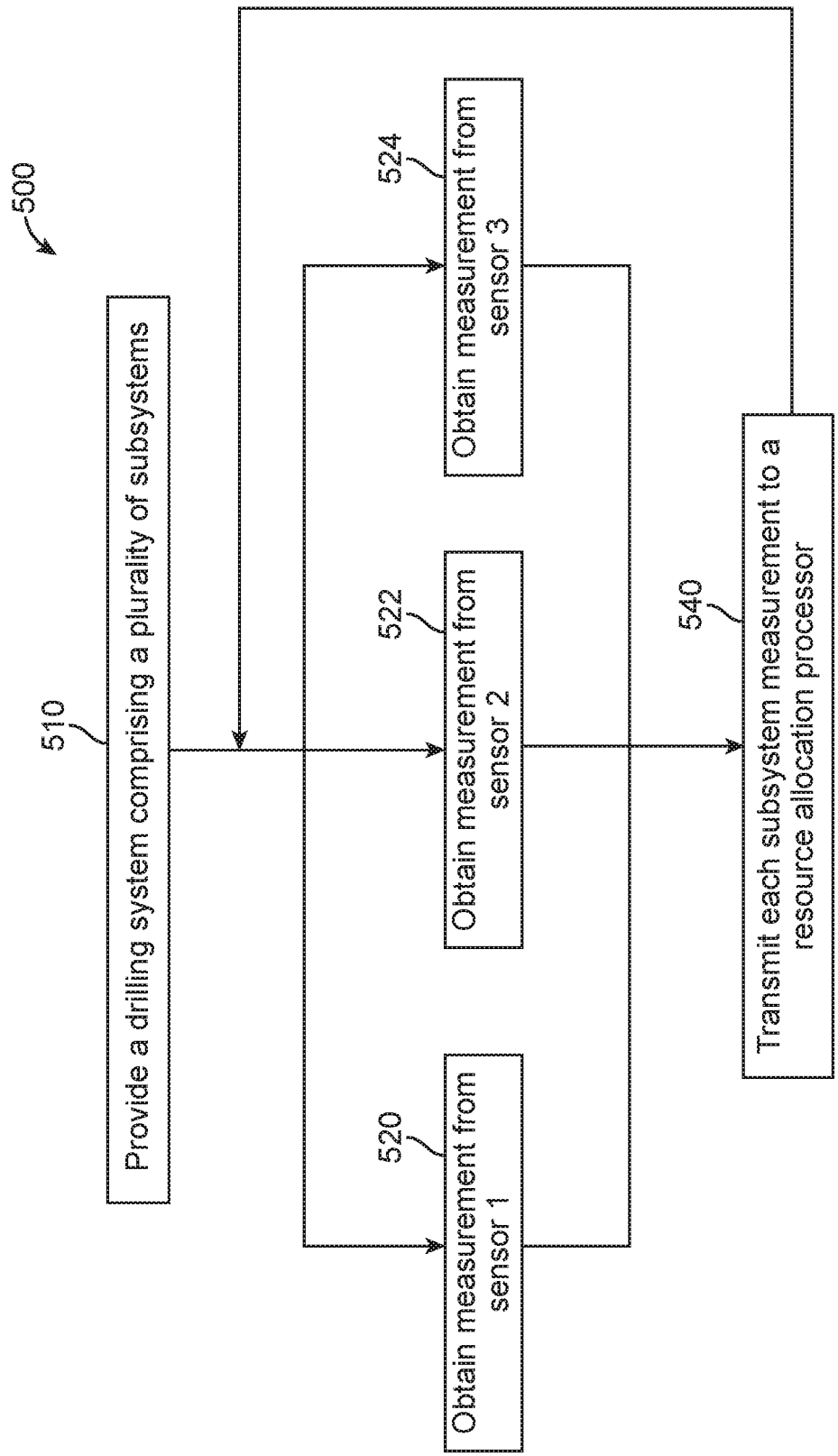
FIG. 5 is a flowchart illustrating a method for transmitting measurements from each of a plurality of subsystems according to the disclosure herein.
Figure 6:
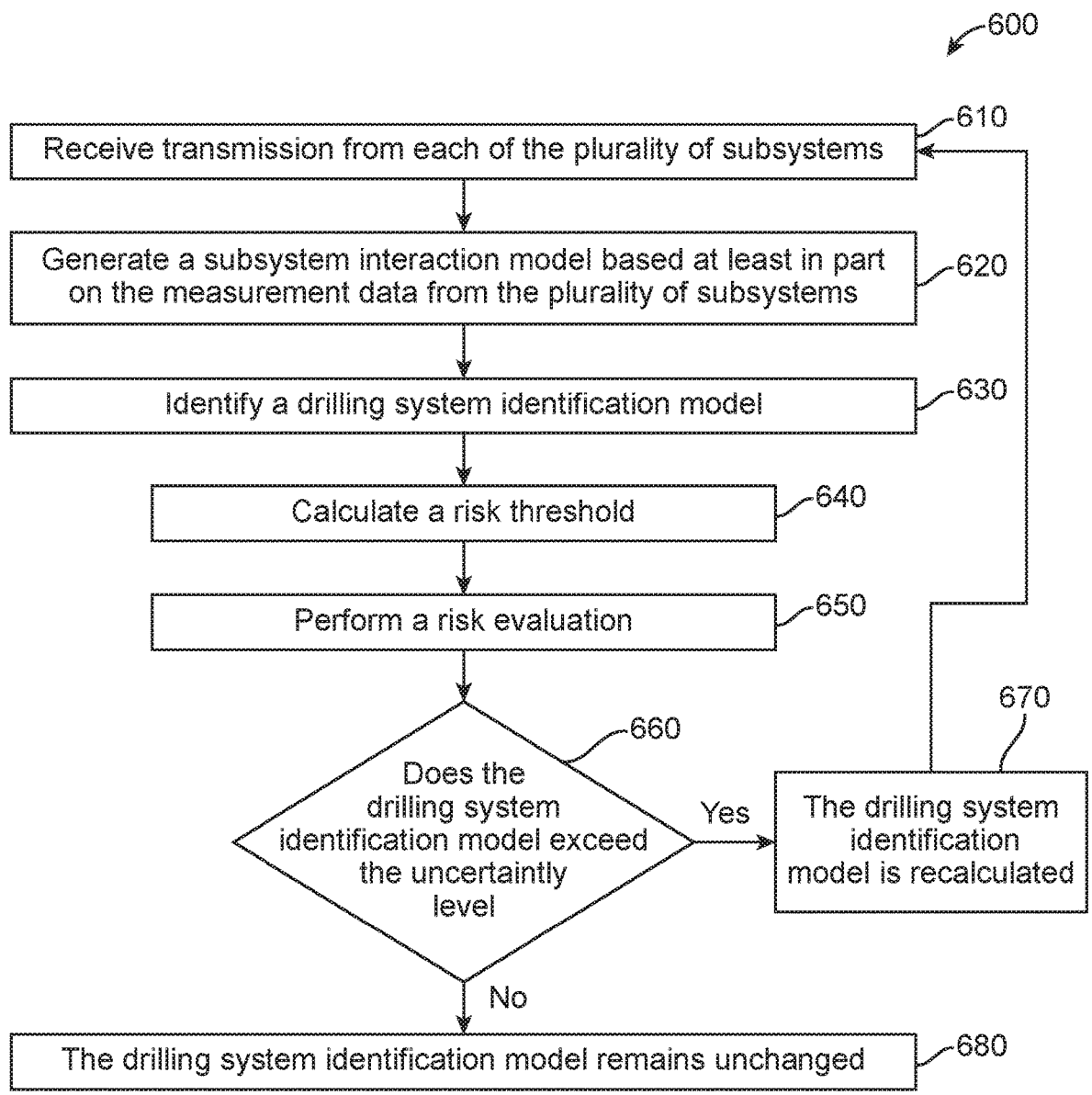
FIG. 6 is a flowchart illustrating a method for identifying an accurate drilling system identification model according to the disclosure herein.
Figure 7:
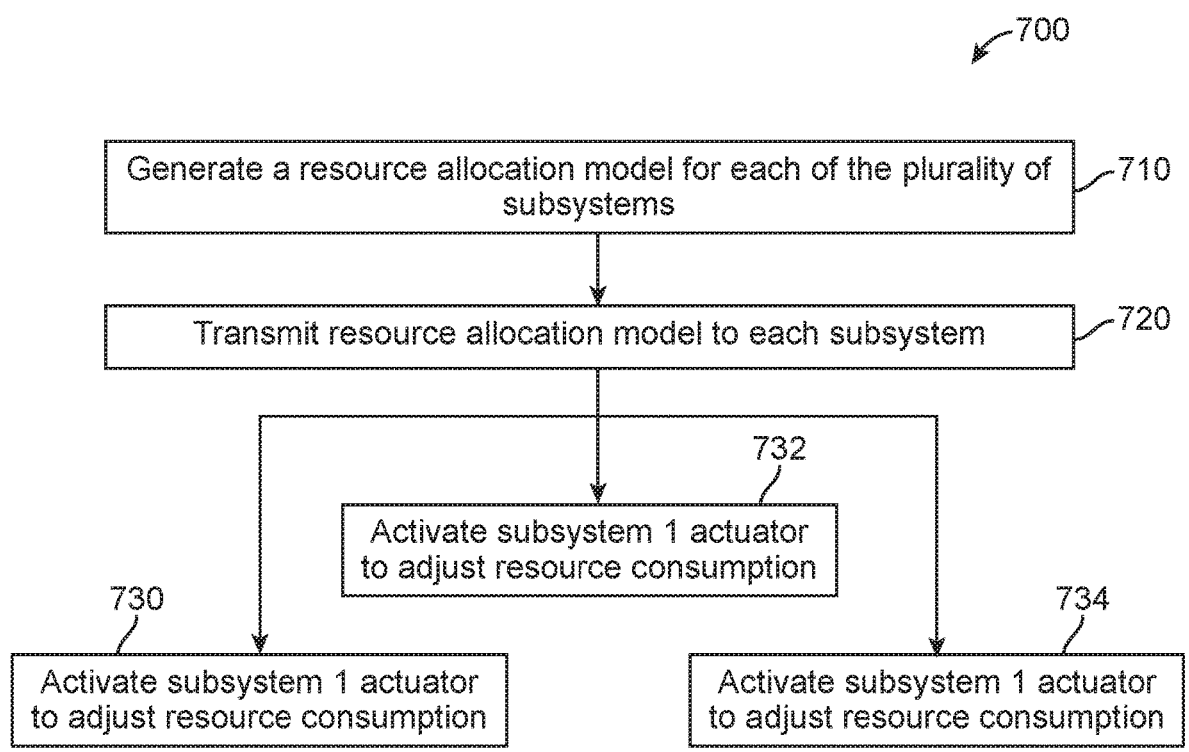
FIG. 7 is a flowchart illustrating a method for generating a resource allocation model according to the disclosure herein.

A method for resource allocation throughout a drilling system, such as the one described above with respect to FIGS. 1-4, can follow the flow diagrams 500, 600, and 700 as depicted in FIGS. 5-7, respectively. A method 500 for transmitting measurements from each of the plurality of subsystems is shown in FIG. 5. For example, beginning at block 510, a drilling system is provided comprising a plurality of subsystems spaced throughout the drilling system. While the illustrated example shows a drilling system comprising three subsystems, it should be noted that any number of subsystems can be present. In block 520, a sensor of subsystem 1 obtains a measurement. The measurement taken by the sensor can be, but is not limited to, hook load, top-drive torque, pump/choke, pressure/opening, BHA toolface, and rotational position and speed.

Similarly, at blocks 522 and 524 a measurement is obtained from the sensor of subsystem 2 and subsystem 3, respectively. In block 540, the measurement taken from each of subsystems 1, 2, and 3 is transmitted to a resource allocation processor. The method can repeat itself such that measurements for each subsystem are continuously taken.

A method 600 for identifying a drilling system identification method for a drilling system is shown in FIG. 6. For example, beginning at block 610 the resource allocation processor receives a transmission of measurement data from each of the plurality of subsystems. At block 620, the resource allocation processor generates a subsystem interaction model. The subsystem interaction model can be based at least in part on the measurement data from each of the plurality of subsystems. The model can also be based on specific physical characteristics of each individual subsystem. At block 630, the resource allocation processor uses the received information and the subsystem interaction model to identify a drilling system identification model, representing the interaction between each of the subsystems. At block 640, a risk threshold is calculated. The risk threshold is determined using the drilling system identification model to evaluate kinematics data. A model evaluation, or residue estimation, is conducted to evaluate the accuracy of the drilling system identification model identified at block 630. At block 650, a risk evaluation is performed. The risk evaluation uses both the subsystem interaction model and the risk threshold to run an automatic risk analysis using a distributed system fault analysis technique. The risk evaluation is used to determine a time frame in which the current drilling system identification model will lead to overall system failure.

At block 660, the resource allocation processor determines whether or not the drilling system identification model exceeds the uncertainty level, or residue threshold. The uncertainty level is determined based on the residue between the data and the drilling system identification model. If the residue has a trend which exceeds the uncertainty level, the method proceeds to block 670, and a new drilling system identification model is calculated to achieve a more accurate model. If the residue is within the uncertainty level, the current drilling system identification model is sufficient, the method proceeds to block 680 and the drilling system identification model remains unchanged.

A method 700 for allocating a plurality of resources throughout a drilling system using a resource allocation processor is shown in FIG. 7. For example, beginning at block 710, the resource allocation processor uses the results of the risk evaluation to generate a resource allocation model for the drilling system. The resource allocation model can be, but is not limited to, a strategy for allocating each of a plurality of resources. The resource allocation model includes a breakdown of which subsystems have access to which resources and how much of each resource the subsystem can consume.

At block 720, the resource allocation model is transmitted to each of the plurality of subsystems. At block 730, the actuator of subsystem 1 is activated such that it adjusts the resource consumption of subsystem 1 to comply with the resource allocation model provided. Similarly, the actuators of subsystems 2 and 3 are activated in blocks 732 and 734, respectively, to allow subsystems 2 and 3 comply with the resource allocation model. The above described process can repeat on a continuous loop, such that the global processor is constantly updated with the real-time data from each of the subsystems.

EXAMPLES

The following examples are provided to illustrate the subject matter of the present application. The examples are not intended to limit the scope of the present disclosure and should not be so interpreted.

Example 1—Rig to BHA

Figure 8:
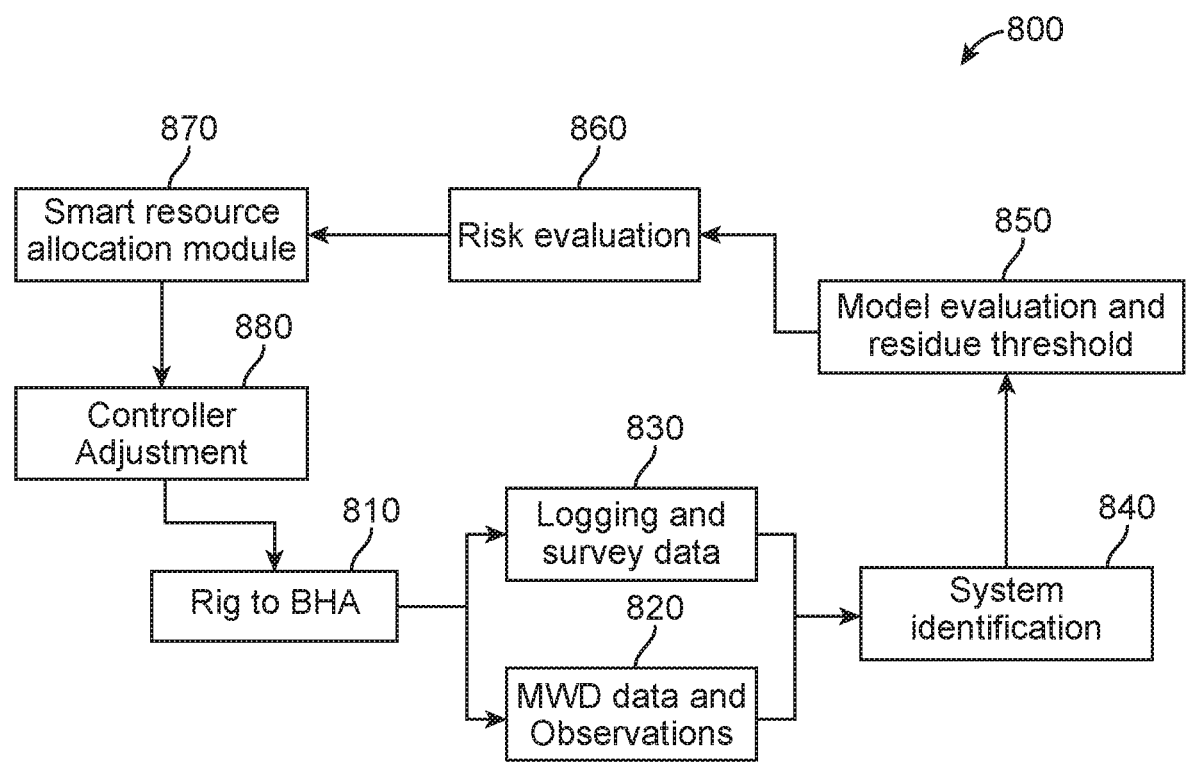
FIG. 8 illustrates a block diagram for a dynamic risk analysis and smart resource allocation scheme.

Drilling dynamics, such as axial and rotational motion of the system can affect the interaction between subsystems, and in turn affect equipment failure. FIG. 8 illustrates a diagram 800 of dynamic risk analysis and smart resource allocation between the rig subsystem and the BHA subsystem. The drilling dynamics between the rig and BHA subsystems 810, such as axial and rotational motion of the system, can be sensed using multiple methods. In block 820 the drilling dynamics are sensed using an MWD device or users who are able to input their observations in real-time. In addition, at block 830 kinematics, such as formation change, borehole shape, rock mechanics, and bit wear, can be measured or derived from logging or survey data.

To determine a dynamic subsystem model, both the logging/survey data and the MWD/observation data are compiled over a predefined interval of time. The dynamic subsystem model can be a general, nonlinear time variation and, during a short duration of time, the system can be approximated as a linear model (for example, a lumped mass model or a finite element model). For the purposes of this example, a linear model is used. A subsystem interaction model can be determined using the drilling system model, the interaction model is configured to reflect the coupling of the subsystems involved in the drilling system and can be derived using Equation 1.

$$\dot{X}_{ij} = A_{ij}X_{ij} + B_{ij}U_j \qquad (1)$$

Wherein $X_{ij}$ are interaction states that reflect the impact of input from subsystem j ($U_j$) onto the original states of subsystem i, and $A_{ij}$ and $B_{ij}$ each represent drilling dynamics for subsystems i and j as described above. For example, Eqn. 1 can be used to evaluate how the drilling speed can be impacted by the surface input (hook load and torque) or fluid properties (density, viscosity, and flow rate), and how the drilling fluid circulation efficiency is impacted by pump/choke pressure, drill string rotational speed, and ROP.

At block 840, the system identification module can evaluate the kinematic data in order to calculate a risk threshold, to determine whether a failure event will occur during the drilling process. For example, when the bit travels through critically thin formation, the risk threshold is low because a small deviation in the drilling dynamics and drilling path can lead to system failure.

At block 850, the model, determined above, and a predetermined residue threshold, can be used to evaluate the accuracy of the overall drilling system model. If the residue between the newly accumulated data and the drilling system model is less than the predetermined threshold, the model remains the same. In the alternative, if the residue between the data and the drilling system model exceeds the predetermined threshold, the system identification no longer matches the overall system and the model must be changed.

The risk evaluation module automatically checks the risks based on the model and the risk threshold and calculates the best resource allocation model. At block 860 a failure evaluation is performed to determine the likelihood of the drilling system will go into failure. The failure evaluation can be, but is not limited to, an equipment failure or a drilling failure. Assuming, for the purposes of this Example, the resource allocation model is configured to minimize cost, a pre-defined cost function can be embedded in the system failure analysis. The cost function can be in deterministic form, as shown in Equation 2.

$$c(u) = \int [a_1(ROP-ROP^*)^2 + a_2 r_d^2 + a_3 w^2 + a_4(e_c - e_c^*)^2 + a_5 u^2 + a_6 f_T^2] \quad (2)$$

In the alternative, the cost function can be in a stochastic form, as shown in Equation 3.

$$c(u) = E\int [a_1(ROP-ROP^*)^2 + a_2 r_d^2 + a_3 w^2 + a_4(e_c - e_c^*)^2 + a_5 u^2 + a_6 f_T^2] \quad (3)$$

Wherein u denotes the inputs of each of the plurality of subsystems, $r_d$ denotes the energy dissipation ration, w denotes the bit wear and the mud motor wear, $e_c$ and $e_c^*$ denote the real and desired cutting efficiency (respectively), ROP and ROP* denote the real and desired rate of penetration, and $f_T$ denotes the failure index of the overall system. As shown above, $f_T$ is a function of T, the time interval it takes for the system to reach failure. Therefore, the larger the time interval (T) the lower $f_T$ will be. While the Eqns. 2 and 3 above are configured to minimize cost, those of skill in the art would understand that similar Equations can be used to achieve other system goals.

For the purposes of this disclosure, system failure is defined as an event would render the drilling system unable to operate. For example, the risk threshold for ECD is the downhole drilling pressure margin, and an event where the ECD exceeds the margin would be considered a system failure. In Eqns. 2 and 3, $a_1$ to $a_6$ denote the weights that sum to 1, herein $a_i \geq 0$ for any i. The weights can be adapted to the drilling environment (for example, a critical event such as changing the bit will trigger the weight change in the cost function).

In block 870, a resource allocation model is determined. The optimization in the distributed control can be to optimize the overall system by adjusting the subsystem's inputs, such as local inputs u of each of the plurality of subsystems to minimize the cost functions, as shown in Eqns. 2 and 3, subject to the constraints of Eqn. 1 and the local input constraints. In the above described situation, the risk metric is balanced with a reward metric, risk can be taken (for example, increased WOB or reducing control) if the reward (for example, ROP) is worth the risk.

In block 880 the subsystem controllers receive the resource allocation model and in response adjust the resource consumption of each of the subsystems.

Example 2—Determining System Failure

Figure 9A:
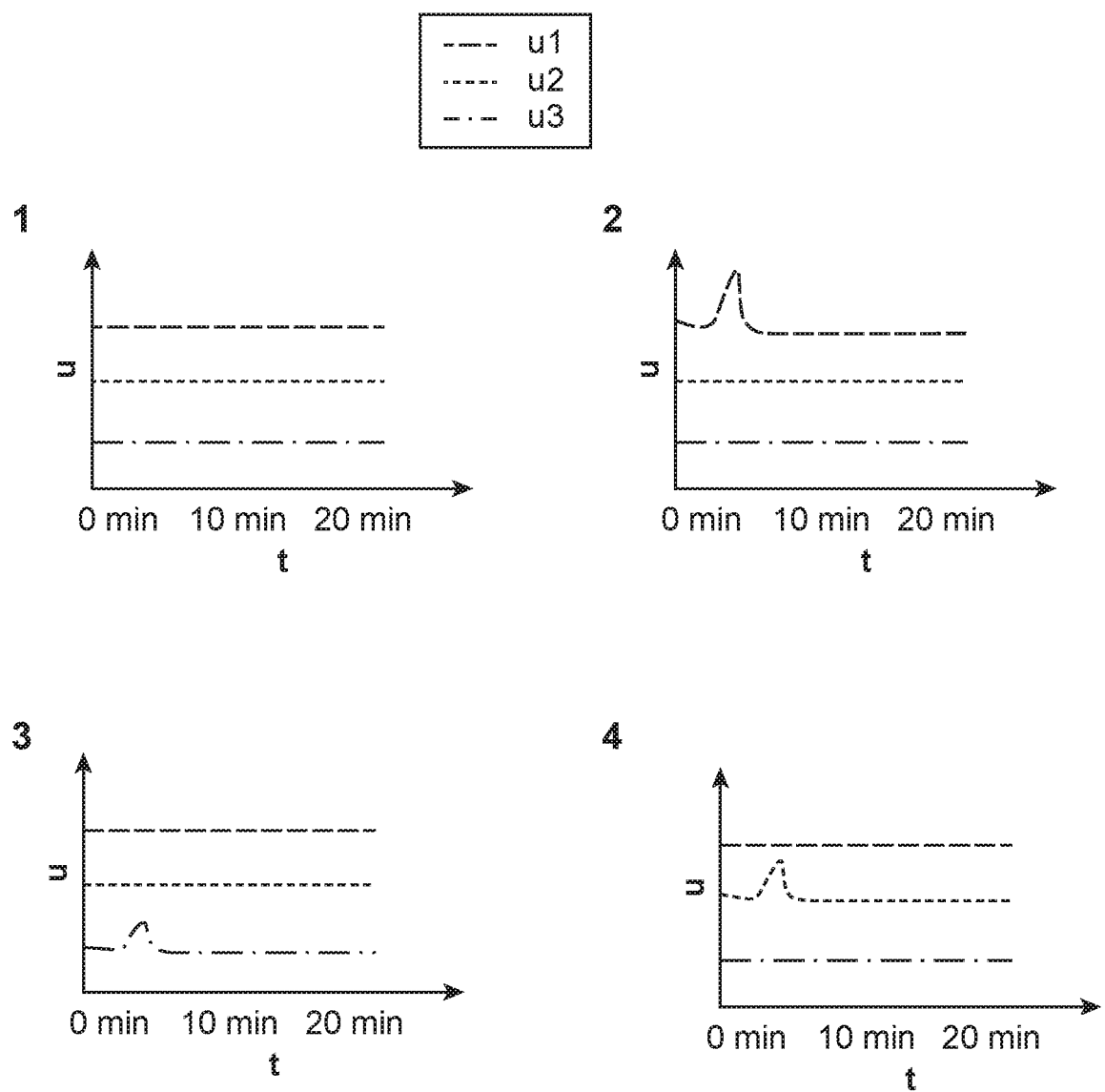
FIG. 9A illustrates an irregularity in each of the plurality of subsystems.
Figure 9B:
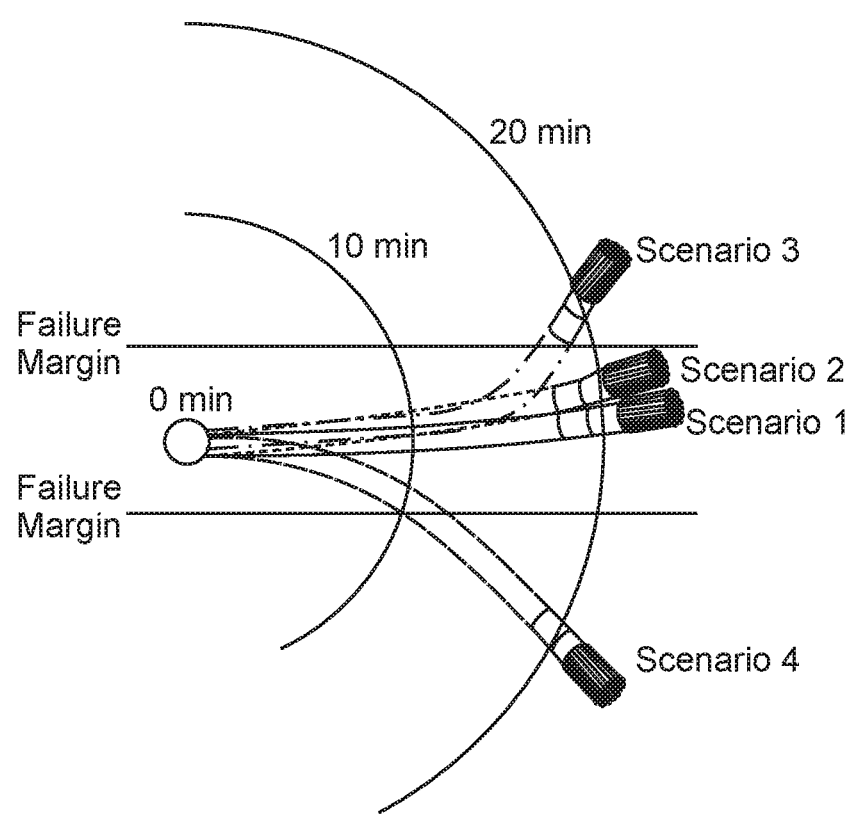
FIG. 9B illustrates the failure index quantification between the plurality of subsystems.

The risk analysis can be configured to quantify potential damage to the overall system of subsystem input by agitating the subsystem inputs and estimating the time until system failure. The impact of each subsystem on the overall system is shown in FIGS. 9A and 9B. For the purposes of this Example, generic subsystems (u1-u3) are used.

FIG. 9A illustrates which of subsystem u1 to u3 is agitated in a series of Scenarios. The results of each agitation is shown in FIG. 9B. Scenario 1 shows the drilling trajectory over 20 minutes when each of the subsystem's inputs (u1 to u3) remain the same. Scenarios 2-4 show how the drilling trajectory would deviate when one of the subsystem inputs is perturbed. In FIG. 9A, Scenario 2 shows a change in the input of subsystem u1, Scenario 3 shows a change in the input of subsystem u3, and Scenario 4 shows a change in the input of subsystem u2.

FIG. 9B shows that the input of subsystem u1 (Scenario 2) does not significantly affect the drilling trajectory. In the alternative, the overall system is significantly affected by a change in the inputs of subsystems u2 and u3, as shown in Scenarios 3 and 4. In Scenario 4, an adjustment of the input of subsystem u3, affects the drilling trajectory quickly and on a large scale; failure occurs in almost half the time of Scenario 3.

In this Example, the failure index for the overall system was quantified based on both the deviation degree and the deviation speed. Based on the above defined quantifications, it can be shown that subsystem u2 is the most "dangerous" to the overall drilling system performance. Thus the $f_T$ corresponding to subsystem u2 is high.

In the alternative, the failure index can be calculated based on probability. For example, the probability that the overall system would exceed the failure margin can be quantified for each subsystem's input disturbances or changes. The higher probability and shorter time period in which a subsystem would induce the overall system failure, the higher corresponding $f_T$. The failure index quantification can then be applied to the risk analysis function, as described by Eqns. 2 and 3.

In addition, similar failure index quantifications can be applied in order to quantify the subsystem's involuntary failure, in order to model the inaccuracy of each subsystem. For example, when the risk analysis shows the current model does not match the drilling system identification model, or shows that the system is at high risk with normal subsystem inputs, it indicates the need to update the drilling system identification model.

Example 2—Smart Resource Allocation

After the system failure analysis is performed, the resources used throughout the drilling system can be re-allocated between each of the plurality of subsystems.

Resources can include, but are not limited to, communication band-width, control energy, band width and priority, and computational resources. Using the Scenarios provided in FIGS. 9A and 9B, the resource allocation processor can automatically assign resources, or priorities, to each of the plurality of subsystems in the following order: subsystem u2>u3>u1, based on their impacts to the overall drilling system performance. Thus, the subsystem controller for subsystem u2 needs to be the strictest, acquiring more real-time data and more frequent model updates, and requiring more communication power and computational allowance.

Compared to subsystem u2, subsystem u3 can be monitored and manipulated at a slower pace, since the subsystem will not cause failure as quickly. Subsystem u1 requires the least amount of resources, since disturbance in subsystem u1 does not significantly affect the overall drilling performance.

Figure 10:
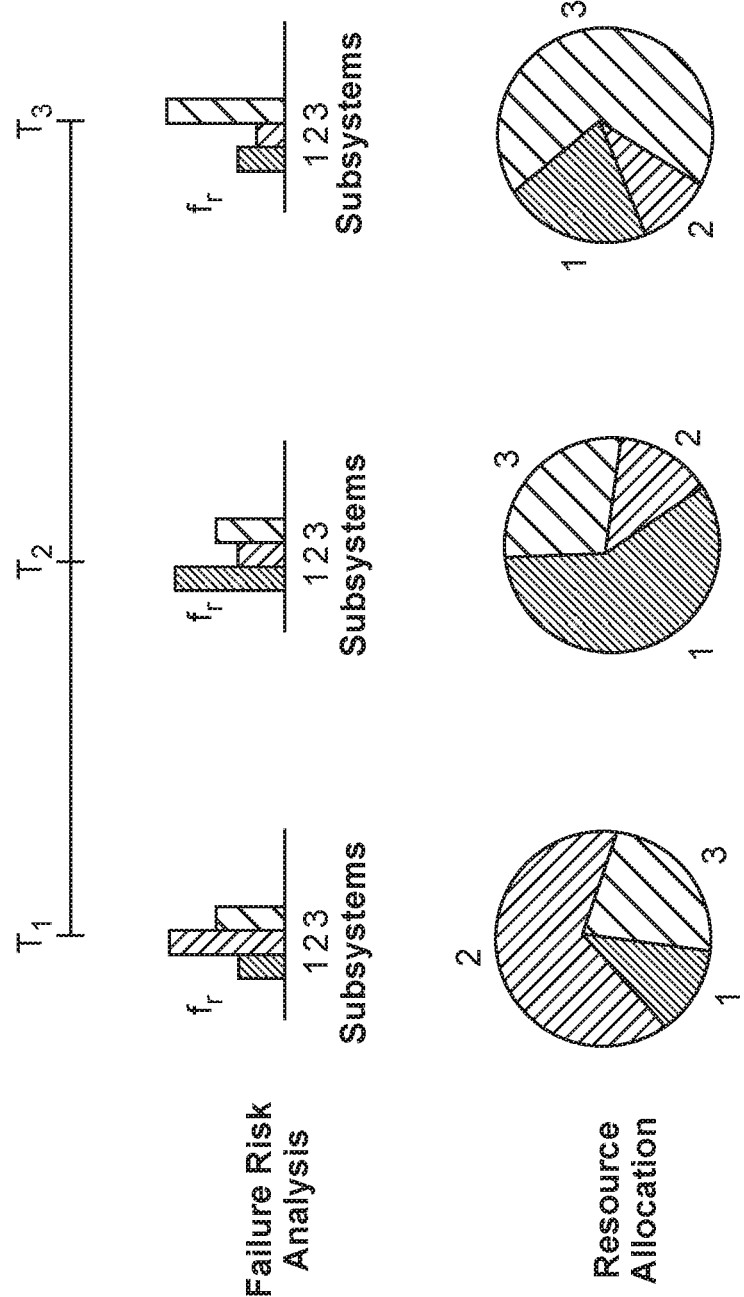
FIG. 10 illustrates a dynamic risk analysis and resource allocation scheme over a of time period.

In addition to resource competition, the subsystems can also be subject to local interaction constraints. For example, the highest priority is to operate the most "dangerous" subsystem within its operation constraints, which can compromise the performance of the other subsystems. FIG. 10 illustrates how the resources can be smartly allocated throughout the drilling system.

FIG. 10 shows the drilling conditions at each of a plurality of times, $T_1$-$T_3$. At each time period, the subsystem interaction model is approximated using linear interaction models, as described above, an equipment failure evaluation is conducted and the residue threshold is quantified for each of the plurality of subsystems. The resources are then allocated to each subsystem based on the risk analysis and failure index. As the failure evaluation is adapted to the operation condition, the subsystem's risk impacts vary, thus resource assignment is time dependent. For example, at $T_1$, subsystem 2 is the highest risk and thus requires the largest allocation of resources. At $T_2$, the drilling system conditions have changed and subsystem 1 presents the highest risk of failure, thus the resources are reallocated such that subsystem 1 can have more control. Similarly, at $T_3$, the drilling system conditions have changed again, requiring resource allocation to adjust and provide the majority of resource control to subsystem 3.

The subsystem controller for each of the plurality of subsystems can be designed based on the smartly allocated resource. For example, a conservative controller can be adopted for a high risk subsystem, while a comprehensive controller can be designed for subsystem with high access to resources, an aggressive controller can be applied to a low risk subsystem, and a robust controller can be applied to a subsystem with high communication delays. The selected controllers can then be implemented throughout each of the subsystems to regulate the overall system performance, allowing for a low risk, high performance drilling system.

Numerous examples are provided herein to enhance understanding of the present disclosure. A specific set of statements are provided as follows.

Statement 1: A system comprising a plurality of subsystems, each subsystem comprising a subsystem controller communicatively coupled with a sensor, an actuator, and a subsystem processor, wherein the sensor obtains a measurement; and a resource allocation processor communicatively coupled with each of the plurality of subsystems, the resource allocation processor comprising a memory storing instructions which cause the resource allocation processor to: determine a drilling system model, receive the measurements from each of the plurality of subsystems, generate a subsystem interaction model based at least in part on the dynamic subsystem model of each of the plurality of subsystems, run a risk evaluation based at least in part on the subsystem interaction module and a risk threshold, generate a resource allocation model, and transmit the resource allocation model to each of the plurality of subsystems; and wherein the subsystem controller in each of the plurality of subsystems activates the actuator to adjust a subsystem parameter to meet the resource allocation model.

Statement 2: A system according to Statement 1, further comprising an input device coupled with the resource allocation processor.

Statement 3: A system according to Statement 1 or Statement 2, wherein each of the plurality of subsystems are one of a rig subsystem, a mud circulation subsystem, and a bottom hole assembly (BHA) subsystem.

Statement 4: A system according to Statements 1-3, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 5: A system according to Statements 1-4, wherein the subsystem controller of the BHA subsystem transmits measurements obtained from the sensor to the resource allocation processor.

Statement 6: A system according to Statements 1-5, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 7: A system according to Statements 1-6, wherein the subsystem parameter controlled by the actuator of the BHA subsystem is selected from the group consisting of a well path, a drill bit orientation, a path, a steering, and a drill string orientation.

Statement 8: A system according to Statements 1-7, wherein the measurement taken by the sensor of the rig subsystem is selected from the group consisting of an RPM, a weight-on-bit (WOB), a torque-on-bit (TOB), a rate of penetration (ROP), a well depth, a hook load, and a standpipe pressure.

Statement 9: A system according to Statements 1-8, wherein the subsystem controller of the rig subsystem transmits measurements obtained from the sensor to the resource allocation processor.

Statement 10: A system according to Statements 1-9, wherein the subsystem parameter controlled by the actuator of the rig subsystem is selected from the group consisting of an RMP, a WOB, a TOB, an ROP, and a hook load.

Statement 11: A system according to Statements 1-10, wherein the measurement taken by the sensor of the mud circulation subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 12: A system according to Statements 1-11, wherein the subsystem controller of the mud circulation subsystem transmits measurements obtained from the sensor to the resource allocation processor.

Statement 13: A system according to Statements 1-12, wherein the subsystem parameter controlled by the actuator of the mud circulation subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 14: A system according to Statements 1-13, wherein the subsystem controller of each of the plurality of subsystems transmits a plurality of control signals to the actuator of each of the plurality of subsystems.

Statement 15: A system according to Statements 1-14, wherein the drilling system model maximizes the time period the drilling system can operate prior to a failure.

Statement 16: A system according to Statements 1-15, wherein the subsystem interaction module comprises the following equation $\dot{X}_{ij}=A_{ij}X_{ij}+B_{ij}U_j$ wherein $X_{ij}$ are interaction states and $U_j$ is subsystem j.

Statement 17: A system according to Statements 1-16, wherein the risk threshold is a predetermined range.

Statement 18: A system according to Statements 1-17, wherein the risk evaluation evaluates a time period in which the drilling system will go into failure.

Statement 19: A system according to Statements 1-20, wherein the resource allocation model controls a plurality of resources.

Statement 20: A system according to Statements 1-19, wherein the resource allocation model determines an order of priority for each of the plurality of subsystems with respect to each the plurality of resources.

Statement 21: A method comprising providing a drilling system comprising a plurality of subsystems, each of the plurality of subsystems comprising a subsystem controller communicatively coupled with a sensor, an actuator, and a subsystem processor; obtaining, at the sensor, a measurement; providing a resource allocation processor communicatively coupled with each of the plurality of subsystems; determining a drilling system model; receiving, from each of the subsystem controllers, the measurement data; generating a subsystem interaction model based at least in part on the dynamic subsystem model of each of the plurality of subsystems; running a risk evaluation based at least in part on the subsystem interaction module and a risk threshold; generating a resource allocation model; transmitting, from the resource allocation processor, the resource allocation model to each of the plurality of subsystems; and activating, at each of the plurality of subsystems, the actuator to adjust a subsystem parameter to meet the resource allocation model.

Statement 22: A method according to Statement 21, further comprising receiving data from an input device coupled with the resource allocation processor.

Statement 23: A method according to Statement 21 or Statement 22, wherein each of the plurality of subsystems are one of a rig subsystem, a mud circulation subsystem, and a bottom hole assembly (BHA) subsystem.

Statement 24: A method according to Statements 21-23, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 25: A method according to Statements 21-24, wherein the subsystem controller of the BHA subsystem transmits measurements obtained from the sensor to the resource allocation processor.

Statement 26: A method according to Statements 21-25, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 27: A method according to Statements 21-26, wherein the subsystem parameter controlled by the actuator of the BHA subsystem is selected from the group consisting of a well path, a drill bit orientation, a path, a steering, and a drill string orientation.

Statement 28: A method according to Statements 21-27, wherein the measurement taken by the sensor of the rig subsystem is selected from the group consisting of an RPM, a weight-on-bit (WOB), a torque-on-bit (TOB), a rate of penetration (ROP), a well depth, a hook load, and a standpipe pressure.

Statement 29: A method according to Statements 21-28, wherein the subsystem controller of the rig subsystem transmits measurements obtained from the sensor to the resource allocation processor.

Statement 30: A method according to Statements 21-29, wherein the subsystem parameter controlled by the actuator of the rig subsystem is selected from the group consisting of an RMP, a WOB, a TOB, an ROP, and a hook load.

Statement 31: A method according to Statements 21-30, wherein the measurement taken by the sensor of the mud circulation subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 32: A method according to Statements 21-31, wherein the subsystem controller of the mud circulation subsystem transmits measurements obtained from the sensor to the resource allocation processor.

Statement 33: A method according to Statements 21-32, wherein the subsystem parameter controlled by the actuator of the mud circulation subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 34: A method according to Statements 21-33, further comprising transmitting a plurality of control signals from the subsystem controller to the actuator of each of the plurality of subsystems.

Statement 35: A method according to Statements 21-34, wherein the drilling system model maximizes the time period the drilling system can operate prior to a failure.

Statement 36: A method according to Statements 21-35, wherein the subsystem interaction module comprises the following equation $\dot{X}_{ij}=A_{ij}X_{ij}+B_{ij}U_j$ wherein $X_{ij}$ are interaction states and $U_j$ is subsystem j.

Statement 37: A method according to Statements 21-36, wherein the risk threshold is a predetermined range.

Statement 38: A method according to Statements 21-37, wherein the risk evaluation evaluates a time period in which the drilling system will go into failure.

Statement 39: A method according to Statements 21-38, wherein the resource allocation model controls a plurality of resources.

Statement 40: A method according to Statements 21-39, wherein the resource determines an order of priority for each of the plurality of subsystems with respect to each of the plurality of resources.

Statement 41: An apparatus comprising a plurality of subsystems comprising communicatively coupled with a resource allocation processor, wherein each of the plurality of subsystems comprises a controller communicatively coupled with a sensor, an actuator, and a processor, and wherein the processor further comprises a memory storing instructions which cause the processor to: receive, from the sensor, a measurement, transmit, from the controller, the measurement to the resource allocation processor, receive, from the resource allocation processor, a resource allocation model, and activate the actuator to adjust a parameter to meet the resource allocation model.

Statement 42: An apparatus according to Statement 41, wherein each of the plurality of subsystems are one of a rig subsystem, a mud circulation subsystem, and a bottom hole assembly (BHA) subsystem.

Statement 43: An apparatus according to Statement 41 or Statement 42, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 44: An apparatus according to Statements 41-43, wherein the subsystem controller of the BHA subsystem transmits measurements obtained from the sensor to the resource allocation processor.

Statement 45: An apparatus according to Statements 41-44, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 46: An apparatus according to Statements 41-45, wherein the subsystem parameter controlled by the actuator of the BHA subsystem is selected from the group consisting of a well path, a drill bit orientation, a path, a steering, and a drill string orientation.

Statement 47: An apparatus according to Statements 41-46, wherein the measurement taken by the sensor of the rig subsystem is selected from the group consisting of an RPM, a weight-on-bit (WOB), a torque-on-bit (TOB), a rate of penetration (ROP), a well depth, a hook load, and a standpipe pressure.

Statement 48: An apparatus according to Statements 41-47, wherein the subsystem controller of the rig subsystem transmits measurements obtained from the sensor to the resource allocation processor.

Statement 49: An apparatus according to Statements 41-48, wherein the subsystem parameter controlled by the actuator of the rig subsystem is selected from the group consisting of an RMP, a WOB, a TOB, an ROP, and a hook load.

Statement 50: An apparatus according to Statements 41-49, wherein the measurement taken by the sensor of the mud circulation subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 51: An apparatus according to Statements 41-50, wherein the subsystem controller of the mud circulation subsystem transmits measurements obtained from the sensor to the resource allocation processor.

Statement 52: An apparatus according to Statements 41-51, wherein the subsystem parameter controlled by the actuator of the mud circulation subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 53: An apparatus according to Statements 41-52, wherein the subsystem controller of each of the plurality of subsystems transmits a plurality of control signals to the actuator of each of the plurality of subsystems.

Statement 54: An apparatus according to Statements 41-53, wherein the resource allocation model controls a plurality of resources.

Statement 55: An apparatus according to Statements 41-54, wherein the resource allocation model determines an order of priority for each of the plurality of subsystems with respect to each of the plurality of resources.

Statement 56: An apparatus comprising a resource allocation processor communicatively coupled with a plurality of subsystems, wherein the resource allocation processor further comprises a memory storing instructions which cause the resource allocation processor to: determine a drilling system model, receive a measurement from each of the plurality of subsystems, generate a subsystem interaction model based at least in part on the dynamic subsystem model of each of the plurality of subsystems, compare the subsystem interaction model to a residue threshold, run a risk evaluation based at least in part on the subsystem interaction module and a risk threshold, generate a resource allocation model, and transmit the resource allocation model to each of the plurality of subsystems.

Statement 57: An apparatus according to Statement 56, further comprising an input device coupled with the resource allocation processor.

Statement 58: An apparatus according to Statement 56 or Statement 57, wherein each of the plurality of subsystems are one of a rig subsystem, a mud circulation subsystem, and a bottom hole assembly (BHA) subsystem.

Statement 59: An apparatus according to Statements 56-58, wherein the drilling system model maximizes the time period the drilling system can operate prior to failure.

Statement 60: An apparatus according to Statements 56-59, wherein the subsystem interaction module comprises the following equation $\dot{X}_{ij}=A_{ij}X_{ij}+B_{ij}U_j$ wherein $X_{ij}$ are interaction states and $U_i$ is subsystem j.

Statement 61: An apparatus according to Statements 56-60, wherein the risk threshold is a predetermined range.

Statement 62: An apparatus according to Statements 56-61, wherein the risk evaluation evaluates a time period in which the drilling system will go into failure.

Statement 63: An apparatus according to Statements 56-62, wherein the resource allocation model controls a plurality of resources.

Statement 64: An apparatus according to Statements 56-63, wherein the resource allocation model determines an order of priority for each of the plurality of subsystems with respect to each of the plurality of resources.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A system comprising:
   a drilling system comprising a plurality of subsystems, each subsystem comprising:
      a subsystem controller communicatively coupled with a sensor, an actuator, and a subsystem processor, wherein the sensor obtains a plurality of real-time measurements;
   a resource allocation processor communicatively coupled with each of the plurality of subsystems, the resource allocation processor comprising a memory storing instructions which cause the resource allocation processor to:
      receive the plurality of real-time measurements from each of the plurality of subsystems,
      generate a subsystem interaction model based at least in part on a dynamic subsystem model of each of the plurality of subsystems and at least in part on the plurality of real-time measurements from each of the plurality of subsystems,
      determine a drilling system model representing the real-time interaction between each of the plurality of subsystems,
      run a risk evaluation based at least in part on the subsystem interaction model and a risk threshold, wherein the risk evaluation evaluates a time period in which one or more of the plurality of subsystems of the drilling system will go into failure,
      generate a resource allocation model to control a plurality of resources, the plurality of resources comprising at least one of communication band-width, band width and priority, and computational resources, the resource allocation model determining an order of priority for each of the plurality of subsystems with respect to each of the plurality of resources based on the risk evaluation, and
      transmit the resource allocation model to each of the plurality of subsystems to assign each of the plurality of resources;
   wherein the subsystem controller in each of the plurality of subsystems adjusts resource control in real-time based on the order of priority for each of the plurality of subsystems.

2. The system of claim 1, further comprising an input device coupled with the resource allocation processor.

3. The system of claim 1, wherein the drilling system model maximizes the time period the drilling system can operate prior to a failure.

4. The system of claim 1, wherein the subsystem interaction model comprises the following equation:

$$\dot{X}_{ij}=A_{ij}X_{ij}+B_{ij}U_j$$

wherein:
$\dot{X}_{ij}$ is the rate of change of interaction states for subsystems i and j;
$X_{ij}$ are interaction states reflecting the impact of subsystem j onto the original states of subsystem i;
$A_{ij}$ and $B_{ij}$ each represent drilling dynamics for subsystems i and j; and
$U_{ij}$ is the input from subsystem j.

5. The system of claim 1, wherein the each subsystem of the plurality of subsystems is selected from the group consisting of a rig subsystem, a drilling fluid subsystem, and a bottom hole assembly (BHA) subsystem.

6. A method comprising:
   providing a drilling system comprising a plurality of subsystems, each of the plurality of subsystems comprising a subsystem controller communicatively coupled with a sensor, an actuator, and a subsystem processor;
   obtaining, at the sensor, a plurality of real-time measurements;
   providing a resource allocation processor communicatively coupled with each of the plurality of subsystems;
   receiving, from each of the subsystem controllers, the plurality of real-time measurements;
   generating a subsystem interaction model based at least in part on a dynamic subsystem model of each of the plurality of subsystems and at least in part on the plurality of real-time measurements from each of the plurality of subsystems;
   determining a drilling system model representing the real-time interaction between each of the plurality of the subsystems,
   running a risk evaluation based at least in part on the subsystem interaction model and a risk threshold, wherein the risk evaluation evaluates a time period in which one or more of the plurality of subsystems of the drilling system will go into failure;
   generating a resource allocation model operable to control a plurality of resources, the plurality of resources comprising at least one of communication band-width, band width and priority, and computational resources, the resource allocation model determining an order of priority for each of the plurality of subsystems with respect to each of the plurality of resources based on the risk evaluation;
   transmitting, from the resource allocation processor, the resource allocation model to each of the plurality of subsystems assign each of the plurality of resources; and adjusting, at each of the plurality of subsystems, resource control in real-time based on the order of priority for each of the plurality of subsystems.

7. The method of claim 6, further comprising receiving data from an input device coupled with the resource allocation processor.

8. The method of claim 6, wherein the drilling system model maximizes the time period the drilling system can operate prior to a failure.

9. The method of claim 6, wherein the subsystem interaction model comprises the following equation:

$$\dot{X}_{ij}=A_{ij}X_{ij}+B_{ij}U_j$$

wherein:

$\dot{X}_{ij}$ is the rate of change of interaction states for subsystems i and j;

$X_{ij}$ are interaction states reflecting the impact of subsystem j onto the original states of subsystem i;

$A_{ij}$ and $B_{ij}$ each represent drilling dynamics for subsystems i and j; and $U_j$ is the input from subsystem j.

10. The method of claim 6, wherein each of the each subsystem of the plurality of subsystems is selected from the group consisting of a rig subsystem, a drilling fluid subsystem, and a bottom hole assembly (BHA) subsystem.

11. An apparatus comprising:
a resource allocation processor communicatively coupled with a drilling system, the drilling system comprising a plurality of subsystems,
wherein the resource allocation processor further comprises a memory storing instructions which cause the resource allocation processor to:
receive a plurality of real-time measurements from each of the plurality of subsystems,
generate a subsystem interaction model based at least in part on a dynamic subsystem model of each of the plurality of subsystems and at least in part on the plurality of real-time measurements from each of the plurality of subsystems,
determine a drilling system model representing the real-time interaction between each of the plurality of subsystems,
run a risk evaluation based at least in part on the subsystem interaction model and a risk threshold, wherein the risk evaluation evaluates a time period in which one or more of the plurality of subsystems of the drilling system will go into failure,
generate a resource allocation model operable to control a plurality of resources, the plurality of resources comprising at least one of communication bandwidth, band width and priority, and computational resources, the resource allocation model determining an order of priority for each of the plurality of subsystems with respect to each of the plurality of resources based on the risk evaluation, and
transmit the resource allocation model to each of the plurality of subsystems to assign each of the plurality of resources.

12. The apparatus of claim 11, further comprising an input device coupled with the resource allocation processor.

13. The apparatus of claim 11, wherein the drilling system model maximizes the time period the drilling system can operate prior to a failure.

14. The apparatus of claim 11, wherein the subsystem interaction model comprises the following equation:

$$\dot{X}_{ij}=A_{ij}X_{ij}+B_{ij}U_j$$

wherein:

$\dot{X}_{ij}$ is the rate of change of interaction states for subsystems i and j;

$X_{ij}$ are interaction states reflecting the impact of subsystem j onto the original states of subsystem i;

$A_{ij}$ and $B_{ij}$ each represent drilling dynamics for subsystems i and j; and $U_j$ is the input from subsystem j.

15. The apparatus of claim 11, wherein each subsystem of the plurality of subsystems is selected from the group consisting of a rig subsystem, a drilling fluid subsystem, and a bottom hole assembly (BHA) subsystem.

* * * * *